May 11, 1943.  E. L. BARRETT  2,318,660
AUTOMATIC HYDRAULIC TRANSMISSION
Filed Oct. 2, 1940  2 Sheets-Sheet 2
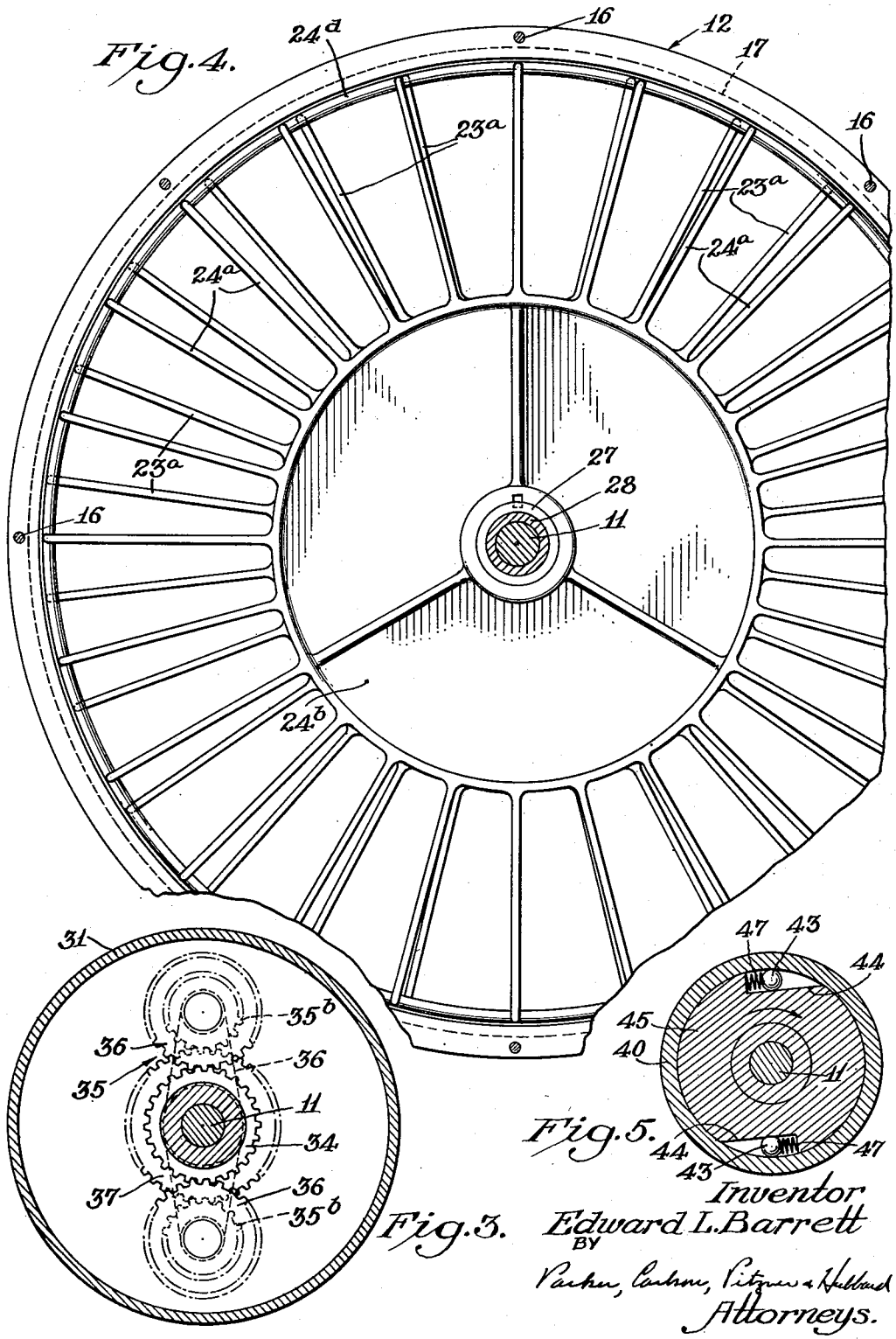

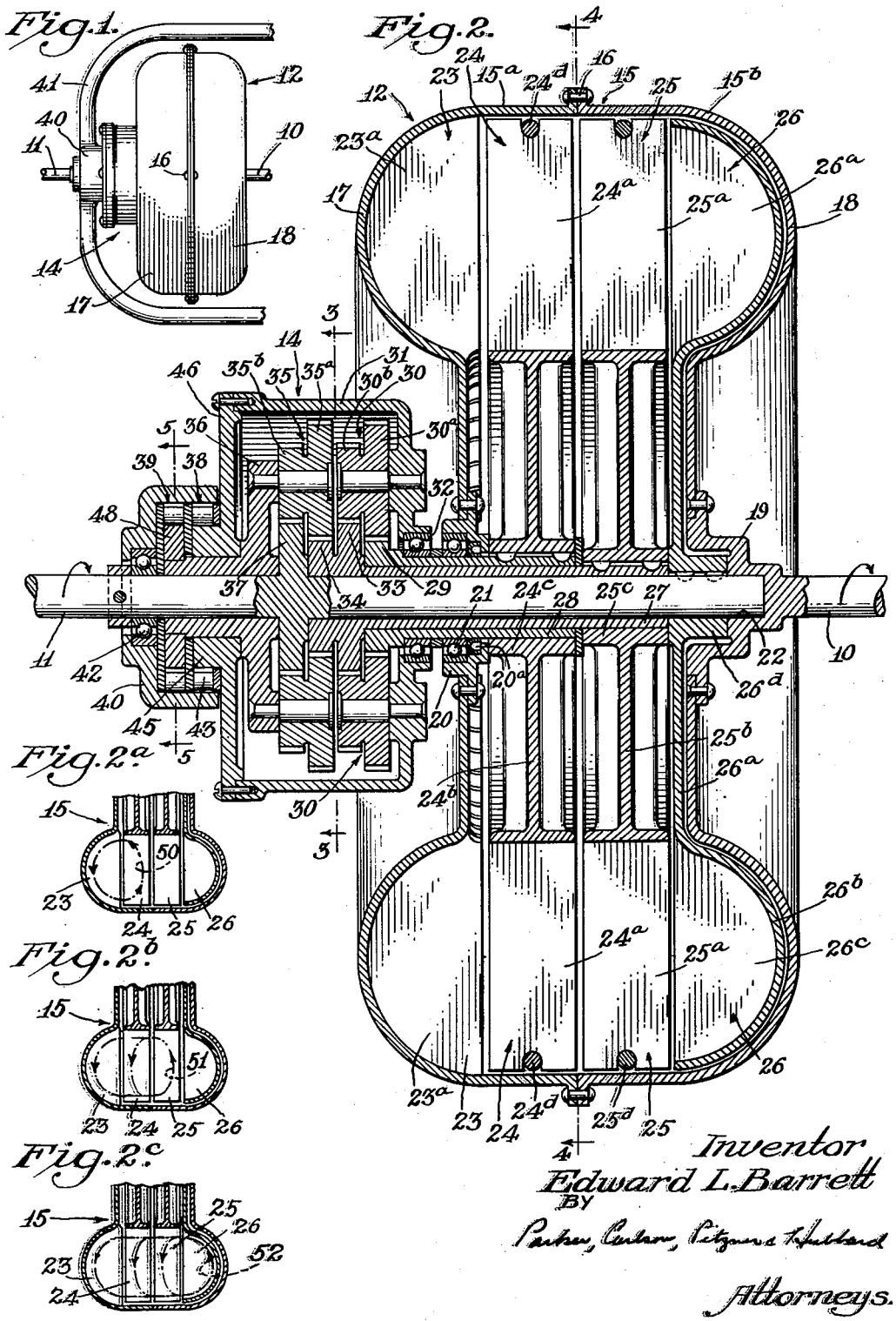

Patented May 11, 1943

2,318,660

UNITED STATES PATENT OFFICE 2,318,660

AUTOMATIC HYDRAULIC TRANSMISSION

Edward L. Barrett, La Grange, Ill., assignor to Barrett Engineering Company, Chicago, Ill., a corporation of Illinois Application October 2, 1940, Serial No. 359,303

3 Claims. (Cl. 74—189.5)

The invention pertains to a novel automatic hydraulic transmission. Automatic transmissions of the type herein contemplated have a wide field of application, serving in general to replace the heretofore common manually operated gear shift type of transmission. An outstanding field of use is in motor vehicles though machine tools and many other types of power driven machines are also improved by the incorporation in them of the presently disclosed automatic transmission.

One object of the present invention is to provide a novel automatic transmission which, though embodying a hydrodynamic type coupling, affords an effectual torque multiplication.

Another object is to provide a novel automatic hydraulic transmission in which the torque multiplication and speed ratio changes afforded are varied smoothly and progressively between limit values, entirely automatically.

Another object is to provide a novel automatic transmission which is torque responsive at any speed, the arrangement being of such character that it, in effect, determines the torque multiplication required at any instant and adjusts the transmission ratio to suit the prevailing conditions, i. e., the ratio of torque input to torque load.

A further object is to provide a novel automatic transmission which requires absolutely no adjustment in the field.

A still further object is to provide a transmission of the type indicated characterized particularly in that it has no external supply or control circuits, fluid, electrical or mechanical, except for the power inlet and outlet shafts.

Another object is to provide a novel automatic transmission in which both wear and noise due to relatively moving parts are virtually entirely eliminated so far as its high speed operation is concerned, since in the latter condition there is no relative movement between toothed parts or the like as in an ordinary gear transmission.

Another object is to provide a transmission of the type indicated, characterized particularly by its low cost, as well as its simplicity of operation and ruggedness of construction.

Another object is to provide a transmission embodying a novel fluid clutch arrangement which serves to disconnect the driven end of the system from the prime mover when the latter is idling, as well as to change automatically the transmission ratio from the prime mover to the driven member as the latter is accelerated.

Still another object is to provide a transmission embodying what may, for convenience, be termed a multiple-driven-element fluid clutch of the hydrodynamic type having its several driven elements interconnected with respective elements of a planetary speed-change gearing, to correlate in a novel manner the operation of the same.

The invention also resides in the multiple-driven-element fluid clutch mechanism disclosed.

Further objects and advantages of the invention will become apparent as the following description proceeds, taken in connection with the accompanying drawings in which:

Figure 1 is a plan view of a transmission embodying the invention.

Fig. 2 is an enlarged longitudinal sectional view of the transmission.

Figs. 2a, 2b and 2c are fragmentary sectional views showing diagrammatically the general paths of circulation of fluid in the fluid clutch of the transmission for various speed settings of the same.

Fig. 3 is a transverse sectional view of the speed-change gearing taken substantially along the line 3—3 in Fig. 2.

Fig. 4 is a transverse sectional view through the fluid clutch casing, taken substantially along the line 4—4 in Fig. 2.

Fig. 5 is a transverse sectional view of one of the one-way clutches included in the gearing and taken substantially along the line 5—5 in Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

By way of exemplification the invention has been illustrated and described herein as embodied in a transmission adapted to connect rotatable driving and driven members shown (Fig. 1), respectively, as a drive shaft 10 and a driven shaft 11. To make plain the correlation of the operation of the transmission with the load and speed demands upon it, it will be assumed in the succeeding description that the transmission illustrated is installed in an automobile since the requirements of such an environment are familiar and can be readily visualized. Accordingly, it may be assumed that the shaft 10 is driven directly by the usual automobile internal combustion engine and that the shaft 11 is connected to the car's propeller shaft and thence to the rear wheels of the vehicle through a suitable reversing mechanism (not shown). The transmission is driven directly from the engine since it serves automatically to declutch the engine from the propeller shaft when the engine is idling, as well as to effect automatically the necessary changes in transmission ratio from the engine to the load as conditions may demand.

In brief, the transmission shown has as its two main components a multiple-driven-element fluid clutch 12 of the hydrodynamic type and a speed-change gearing 14 (Figs. 1 and 2). The speed-change gearing 14 comprises a train of gear elements such that the overall transmission ratio of the train is dependent upon the relative speeds of certain of the elements. The fluid clutch 12, on the other hand, comprises a plurality of fluid actuated driven elements so interconnected with respective ones of the gearing elements, and so correlated with each other, that the speeds at which they drive their respective gearing elements relative to each other (and hence the transmission ratio which they cause to be effected) is automatically proportioned to the demands on the system. Further analysis of this correlation can best be understood with reference to the operation of the exemplary transmission.

Turning first to the details of the instant form of the fluid clutch mechanism 12, it comprises a generally cylindrical closed casing 15 (Fig. 2) made up of two mating casing shells or sections, 15$^a$ and 15$^b$, bolted together at their abutting edge flanges as indicated at 16, this casing being adapted to confine a body of working fluid such as oil. In the opposite end walls of the casing shells 15$^a$, 15$^b$ are annular bulges or recesses of generally semicircular cross section. The casing 15 is fixed to, and revolves with, the drive shaft 10. For this purpose the casing section 15$^b$ is bolted or riveted to a hub 19 on the drive shaft 10, while the opposite casing section 15$^a$ is bolted or riveted to a hub 20, which is journaled for free rotation by an antifriction bearing 21. Leakage of fluid from the casing is prevented by an oil seal, 20$^a$. The driven shaft 11 extends axially within the casing 15, its inner end being received in a pilot bearing 22 in the opposed end of the axially alined drive shaft 10.

Within the casing 15 is a driving impeller, designated generally as 23 (Fig. 2), as well as three driven runners 24, 25 and 26, which are revolved by fluid circulated by the impeller 23. The impeller 23 is rigid with, and formed as a part of the revoluble casing 15. It comprises a plurality of impeller blades 23$^a$ fixed in an annular series in the recess 17 of the casing section 15$^a$ and all extending radially of the axis of the casing (see also Fig. 4). These blades 23$^a$ thus define an annular series of laterally facing, generally semicircular pockets. As the casing 15 revolves, the working fluid in it is thrown outward in the pockets between the blades 23$^a$, due to centrifugal force, and is thence directed laterally outward, by the contour of the pockets, against the adjacent runners to revolve the latter.

The driven runners 24 to 26 are all revoluble with respect to the casing 15 which encloses them (Fig. 2). The two intermediate runners 24 and 25 are substantially identical in form, comprising, respectively, annularly disposed series of blades 24$^a$ and 25$^a$ projecting radially from the peripheries of disk shaped spiders 24$^b$ and 25$^b$ having hubs 24$^c$ and 25$^c$ (see also Fig. 4). Shroud rings 24$^d$ and 25$^d$ encircle the annular series of blades 24$^a$ and 25$^a$, respectively, being let into notches in the ends of the blades. The other, or terminal one, 26, of the series of driven runners is shaped more like the driving impeller 23 than are the intermediate runners. It comprises a generally disk shaped body member 26$^a$ having an annular bulge 26$^b$ in it complemental to the bulge 18 in the casing which receives it. In the annular bulge or recess 26$^a$ is fixed a series of radial blades 26$^c$.

To avoid any so-called "cogging effect" the number of blades on each of the members 23 to 26 is made slightly different from those on the next adjacent members. For example, in the construction shown there are twenty-six blades on the driving impeller 23, twenty-four blades on the intermediate runner 24, twenty-two blades on the runner 25 and twenty blades on the runner 26. Any suitable diversity of the number of blades, however, may be employed and the series may, if desired, progress in the opposite sense, that is, the runner 26 may have the greatest number of blades and the succeeding members in the series progressively less.

The driven runner 26, which is the one remote from the impeller 23, has a hub 26$^d$ keyed to the driven shaft 11. Similarly, the hub 25$^c$ of the intermediate runner 25 is keyed to a sleeve 27 (Fig. 2) telescoped over and loosely journaled on the shaft 11 while the other driven impeller 24 has its hub 24$^c$ keyed to a second sleeve 28 telescoped over and loosely journaled on the first sleeve 27.

It will thus be seen that as the drive shaft 10 revolves the impeller 23, the latter circulates working fluid within the closed circulation path defined within the casing 15, thus tending to cause all of the independently revoluble runners 24 to 26 to turn in unison with it. The precise mode of operation is, however, so closely correlated with, and to an extent dependent upon, the associated gearing 14, that the latter will be described, together with its interconnection to the elements of the clutch 12, before attempting further analysis of the latter's operation. For the present it is sufficient to note that a fluid or impositive coupling of the so-called hydrodynamic type is afforded from the impeller 23 to each of the runners 24 to 26. It is characteristic of such a system that the transfer of power from driver to driven element is accomplished by imparting kinetic energy to the fluid, which is in turn imparted to the runner against which it impinges. Particularly notable here is the fact that the gearing is so correlated as to make possible torque multiplication despite the fact that a hydrodynamic system is used, which in and of itself, inherently cannot effect such multiplication.

As to the second main element of the transmission, namely, the speed reduction gearing 14, it has been shown herein as being of the planetary type and, in fact, includes two complete planetary gearings connected in series to form a unified train. The first of these sections or planetary gearings comprises a first terminal gear 29 (Fig. 2) fast on the sleeve 28 and meshing with intermediate or planet gears 30$^a$ of planet gear clusters 30 journaled on a cylindrical housing 31. This housing is, in turn, freely journaled on the sleeve 28 by an antifriction bearing 32. The other gears 30$^b$ of the clusters 30, mesh with a second terminal gear 33 fast on the inner sleeve 27. The ratio of teeth on the meshing gears 33 and 30$^b$ is two-to-one. With such an arrangement the transmission ratio between the terminal gears 29 and 33 can be varied between a maximum of two-to-one and a minimum of one-to-one. When the relative speeds of these terminal elements 29, 33 is two-to-one the planet clusters 30 rotate about their own axes but the housing 31 is stationary, there being no revolving of the planets about the axis of the terminal elements. In the other limit condition, when the terminals are revolving in unison, the planet clusters 30 and housing 31 also revolve in unison with the terminals. Observe that the clutch's driven members 24 and 25 are drivingly connected to the terminals 29 and 33, respectively, and drive them at the relative speeds required for a particular torque demand, as more fully explained below.

The second section of planetary gearing of the train comprises a first terminal gear 34, fast on the end or second terminal gear 33 of the first section described above. The gear 34 meshes with gears 35ª of intermediate or planet gear clusters 35. These gear clusters 35 are revolubly mounted on the arms of a spider 36 which is, in turn, freely journaled on the shaft 11. The other gear elements 35ᵇ of the planet clusters 35 mesh with a final or second terminal gear 37 for the section and which is fast on the driven shaft 11. Again, the ratio between the planet gears 35ᵇ and terminal gear 37, in the instant construction, is two-to-one. Again, the transmission ratio of this section may be varied between one-to-one and two-to-one. Since the two sections of the gearing are, in effect, connected in series, the maximum over-all speed reduction is four-to-one. In the case of this second section, its first terminal element is driven by the clutch runner 25 while its second terminal element is driven by the runner 26.

In transmitting torque through the first section of the gear train described above, it will be observed that as the first terminal gear 29 is revolved clockwise, the other or driven terminal 33 being loaded and hence resisting rotation, the planet clusters 30 tend to revolve bodily in a counterclockwise direction about the axis of the terminals, or in other words, to revolve the housing 31 counterclockwise. (All references to directions of rotation are assumed as taken from the right hand end of Fig. 2). For the gearing to transmit torque this tendency of the housing to rotate counterclockwise must be restrained. On the other hand, as the second terminal 33 gets underway and approaches the speed of the first terminal 29 the housing 31 with its planets must be free to rotate clockwise. Similarly, in the second section of the gearing the spider 36 must be restrained against counterclockwise rotation (assuming clockwise rotation of the first or driving terminal 34) for the gearing to transmit torque, but the spider must be free to revolve in the opposite or clockwise direction as the speed ratio of the terminal elements diminishes from its two-to-one to its one-to-one value. To meet the conditions set forth one-way roller ratchet brakes 38 and 39 have been provided for connecting, respectively, the housing 31 and spider 36 to a housing 40, rigid on a stationary frame 41, whenever the members 31 and 36 tend to rotate counterclockwise, though leaving them free to rotate clockwise. The brake housing 40 also has in it a ball bearing 42 in which the shaft 11 is journaled.

The one-way brakes 38, 39 are of conventional form. Thus the brake 38 comprises a series of rollers 43 received in notches 44 (see Figs. 2 and 5) in the hub 45 of an end plate 46 bolted to the housing 31. Small compression springs 47 urge the rollers outwardly toward the small ends of the notches 44. When the housing 31 revolves clockwise the rollers 43 are urged toward the larger ends of the notches so that the housing can revolve freely but when the housing tends to revolve in the opposite direction the rollers jam in the outer ends of the notches, thereby frictionally holding the housing against such rotation. The other one-way brake 39 is substantially identical with the brake 38 except that it operates on the hub 48 of the spider 36 so as to prevent counterclockwise rotation of the latter with respect to the stationary housing 40.

In considering the operation of the transmission system described let it first of all be assumed that the engine is idling with the car at standstill. In such case the drive shaft 10, and the casing 15 which is attached to it, are revolved by the engine at a comparatively low speed. Accordingly, the impeller 23 has so little effect upon the working fluid within the casing, in view of this low speed, that the driven runners 24 to 26 remain substantially at rest and the car therefore remains at standstill. Any tendency of the vehicle to creep under such conditions due to slow turning of one or more of the runners, may be checked by the customary brake system of the car.

In order to start the vehicle in motion, the operator has only to open the engine throttle. Such opening of the throttle speeds up the engine, thereby causing the drive shaft 10 to turn at a substantially higher speed. As the casing 15 revolves at this higher speed the curved pockets defined between the impeller blades 23ª throw the working fluid within the casing 15 outwardly due to centrifugal force and then laterally outward through the open faces of the pockets towards the runners 24 to 26.

The theoretically ideal condition which this circulation of fluid should bring about at starting under heavy load is one in which the gearing 14 is operated at its four-to-one speed ratio with the transmission as a whole affording a torque multiplication of four-to-one for starting the car from its standstill condition. For such a four-to-one speed ratio, with maximum efficiency in the clutch 12, or, in other words, with full four-to-one torque multiplication, the runner 24 should turn precisely in unison with the impeller 23, the next runner 25 at half the speed of the runner 24, the final runner 26 (as well as the driven shaft 11 on which it is fixed) at one quarter the speed of the runner 24, and the power input would have to equal the power output. Despite the fact that a single body of working fluid is circulated by a single impeller, as distinguished from a selective control means for directing fluid at selected speeds to selected runners for different speed settings, the ideal condition of operation noted has been very closely approximated in actual practice with the disclosed system. Several important factors of correlation appear to aid in bringing this about. First of all, the resistance to turning of the runners 24 to 26 is governed by the transmission ratio of the portion of the gear train interposed between them and the driven shaft 11. Thus, the runner 24 has a four-to-one gear connection to the shaft 11 and, hence, can be turned with only a fourth of the torque required for the direct connected runner 26. Similarly, the runner 25 has a two-to-one gear connection with the shaft 11 and hence can turn the latter upon the application of only half the torque required in the runner 26, though twice as much as required for the runner 24. Secondly, the runner 24, which has the greatest torque advantage, is next adjacent the impeller 23 and receives the first and greatest impact of the working fluid at starting. The next easiest to turn runner is next in line, and so on. By this correlation of the gear and clutch elements the system is caused automatically to start in its condition of greatest torque multiplication.

Because of the very structure of the apparatus it is difficult to determine the precise path or paths of fluid circulation. Observation of the operation of the externally visible parts of the apparatus leads to the conclusion that the circulation of fluid is as hereinafter described but it should be understood that I do not bind myself to any particular theory on this point. It is believed that the working fluid is initially circulated from each pocket on the impeller 23 in orbital paths substantially of the form indicated by the dot-dash line 50 in Fig. 2a. Some fluid also probably impinges on the runners 25 and 26 but its effect, if not negligible, is, in any event, helpful, since it aids in starting the vehicle since the fluid is turning the runners 25, 26, if at all, in the proper direction. If any substantial increase in speed of these runners above the speed ratios noted above for starting, results initially from fluid impingement, it indicates simply a very light load as compared to engine torque. As to the path of fluid circulation indicated at 50 in Fig. 2a, observe that the fluid is thrown outward in the impeller pockets by centrifugal force, is deflected laterally by the contour of the outer ends of the pockets and impinges against the blades 24ª to turn the runner 24. The fluid then returns to the lower ends of the impeller pockets, completing its orbital path, since that is, or tends to be, a point of low pressure because of the fluid displacement.

As the first driven runner 24 begins to turn as described above, it revolves the sleeve 28 (see Fig. 2) thus turning the gear 29. This first terminal gear 29 of the first planetary section of the speed reduction gearing is connected to the driven shaft 11 through the gearing 29—30ª—30ᵇ—33—34—35ª—35ᵇ—37—11 so that the driven shaft is revolved at one-fourth of the speed of the runner 24 and with a torque multiplication of substantially four-to-one. With the gear elements revolving as described the load on the driven shaft 11 causes the planet gear clusters 35 and 30 to tend to move their supporting members 36 and 31, respectively, in a counterclockwise direction. Such movement of the latter is, however, prevented by the brakes 38 and 39, as described above. During this portion of the starting cycle the other two driven runners 25 and 26 are also accelerating, as the runner 24 accelerates, even though their speed ratio, relation to each other, has not yet changed. Even aside from fluid action in the runners 25, 26 they will, of necessity, be accelerated because of their gear connection to the first runner 24. Thus, since the runner 25 is connected through the sleeve 27 with the gear 34 it must revolve at substantially one-half the speed of the first runner 24 while the third runner 26, being connected with the driven shaft 11 must revolve at one-fourth the speed of the first driven runner 24.

As the vehicle gains momentum the torque load on the driven shaft 11 decreases (assuming a level roadway and constant throttle setting for the engine) and the driven runner 24 thus increases in speed until it is revolving substantially in unison with the driving impeller 23. In this way the elements 23, 24 form a main fluid clutch or coupling for gradually and smoothly applying the initial load to the engine. Upon approaching and reaching a speed at which the runner 24 is turning in unison with the impeller 23, the working fluid is circulated out in a lengthening orbital path indicated by the dot-dash lines 51 in Fig. 2b and in which it impinges on the blades of the second driven runner 25. The working fluid thus exerts torque on this second driven runner 25 so that it is gradually brought up to a speed at which it, too, revolves substantially in unison with the impeller 23 along with the first driven runner 24. With the clutch elements revolving in such manner the first section of the speed reduction gearing 14 is in effect cut out of service. In other words, the two terminal gear elements 29 and 33 are now revolving in unison so that the planetary gear clusters 30 are revolved bodily in a clockwise direction, as is the housing 31. Thus, the driven shaft 11 is now connected to the drive shaft 10 by a two-to-one speed reduction instead of four-to-one, as initially, the change having been effected gradually as the speed ratio of the terminal gear 33 and the terminal gear 29 changes from two-to-one to one-to-one. This diminution in the relative speed between the gears 33 and 29 is indicated by acceleration of the housing 31 in a clockwise direction, an effect easily observable from the exterior of the apparatus. When the gears 29, 33 are finally turning in unison the housing 31 is also rotating at the same speed.

Upon approaching and reaching the condition noted above, in which the bladed members 23, 24 and 25 are all revolving in unison, the working fluid is thrown out in a still longer orbital path, indicated by the dot-dash line 52 in Fig. 2c so that it impinges on the blades of the final driven runner 26 and exerts a torque on it. As this torque increases so does the speed of the runner 26 until it too is revolving substantially in unison with the impeller 23. This final driven runner is, however, directly connected to the driven shaft 11 so that the drive shaft 10 is to all intents and purposes directly connected to the driven shaft 11 in a one-to-one ratio and the speed reduction gearing is, in effect, out of service entirely. Under such condition, the two planetary gearings are revolving as solid masses. Hence, there is no wear of the meshing toothed parts nor is there any noise set up by them since there is no relative movement of the teeth.

From the foregoing, it will be seen that the gear elements 29, 33—34 and 37 of the speed reduction gearing are successively clutched to the drive shaft 10. The change between each setting is, however, gradual so that there is a smooth and progressive change in gear reduction from four-to-one to one-to-one. Moreover, the impositive character of the coupling afforded by the fluid clutch mechanism described controls the application of load to the vehicle engine so as automatically to avoid overloads and stalling.

In the event of an increase in torque load as, for example, when the car goes up a steep incline, the transmission described will automatically change the coupling to effect a torque multiplication and speed reduction of requisite amount and as the increase in load becomes sufficient to require it. Thus, as the load increases the vehicle is slowed down so that the driven shaft 11 revolves more slowly. This results in a difference in speeds between the gear elements 37 and 34 so that a torque multiplication takes place between them, finally becoming approximately two-to-one when the speed of the driven runner 26 drops to half of that of the next adjacent runner 25. Still further increase in load will slow down the runner 25 with respect to the runner 24 so that the gear 33 slows down with respect to the gear 29 and further torque multiplication is induced in the first section of the gearing until finally the maximum of two-to-one in this first section of the speed reduction gearing is also approximated. It will thus be seen that the transmission will automatically shift back, in the case of necessity, to its over-all four-to-one ratio condition. It may be in some cases that this retrogressive "gear shift" will take place in both gearing sections simultaneously but the over-all effect is the same as the sequential operation just described.

In stopping the vehicle it is necessary merely to close the engine throttle and apply the brakes in the usual manner. Closing the engine throttle causes the drive shaft 10 to tend to slow down and thus break the fluid coupling between the clutch elements 23 to 26. It is necessary to apply the brakes only for a quick stop, because, otherwise, the momentum of the car revolves the driven shaft 11 and this in turn causes the series of blades 26c on their runner 26 to turn so that fluid is thrust outward by centrifugal force and an effectual coupling maintained between the elements 23 to 26 so long as the car remains in motion, thereby utilizing the engine compression for braking purposes. Incidentally, this same coupling, accomplished in this manner, makes it possible to use the compression of the engine for braking purposes in descending an incline, just as with a conventional gear transmission.

It will be appreciated from the foregoing that, in general, the transmission described automatically accommodates itself to all driving conditions encountered. The transmission ratio is changed in accordance with ratio of engine to load torque whether that torque ratio change is brought about through a change in vehicle momentum, engine throttle setting, change in road grade, or any other condition. The driver has but to move the throttle in accordance with the speed desired and all changes in transmission ratio requisite for maximum performance characteristics are automatically brought about for him.

I claim as my invention:

1. A variable speed transmission of the hydrodynamic type comprising, in combination with revoluble driving and driven members, a rotatable fluid impeller connected to said driving member for rotation thereby, a series of fluid-impelled driven units disposed for rotation coaxially with said impeller, a torque multiplication gear train having a plurality of relatively rotatable gear elements and in which the overall torque multiplication of the gearing is dependent upon the relative speeds of rotation of the elements of the train, means connecting said driven units to successive elements of said train, a fluid-tight casing enclosing said impeller and said driven units, said impeller and said driven units having means thereon cooperating as an incident to rotation of said impeller for establishing a sequential hydrodynamic coupling between said impeller and successive ones of said units, one after another, to effect rotation of the units at speeds relative to each other and to said impeller proportional to the ratio of torque load on said driven member to torque input on said driving member, and means for connecting said driven member in driven relation with the last one of the series of said driven units.

2. A variable speed transmission of the hydrodynamic type comprising, in combination, rotatable driving and driven members, a rotatable fluid impeller connected in driven relation with said driving member and having means thereon for throwing working fluid radially outward by centrifugal force from an intake point to a discharge point as the impeller revolves, at least two fluid-impelled type revoluble runners, one of said runners having thereon means defining a series of impact surfaces presented to said discharge point in said impeller and defining openings adjacent said impact surfaces communicating directly with said intake point on said impeller, to thereby complete a path for orbital circulation of fluid from said discharge point to said impact surfaces and then directly back to said intake point without contact with the other runner, said other runner having means thereon defining a second series of impact surfaces on it, said first-mentioned means on said one runner also defining a fluid flow channel to complete an alternative orbital path of fluid circulation from said discharge point on said impeller to said second series of impact surfaces on said other runner, a planetary gearing comprising first and second terminal elements and an intermediate element, means for connecting said terminal elements to respective ones of said runners, and means for connecting said driven member in driven relation with said other runner.

3. A variable speed transmission of the hydrodynamic type comprising, in combination, rotatable driving and driven members, a rotatable fluid impeller connected in driven relation with said driving member and having means thereon for throwing working fluid radially outward by centrifugal force from an intake point to a discharge point as the impeller revolves, at least to fluid-impelled type revoluble runners, one of said runners having thereon means defining a series of impact surfaces presented to said discharge point on said impeller and defining openings adjacent said impact surfaces communicating directly with said intake point on said impeller, to thereby define a direct fluid return path thereto for fluid from said discharge point striking said impact surfaces and which path is independent of the other runner, said other runner having means thereon defining a second series of impact surfaces, said first-mentioned means on said one runner also defining a fluid flow channel leading from said discharge point on said impeller to said second series of impact surfaces on said other runner, a planetary gearing comprising first and second terminal elements and an intermediate element, means for connecting said two of said elements to respective ones of said runners, means for preventing rotation of the other of said elements in one direction about the axes of said two elements while permitting such rotation in the opposite direction, and means for connecting said driven member in driven relation with said other runner.

EDWARD L. BARRETT.